United States Patent [19]

Brown

[11] 4,042,455
[45] Aug. 16, 1977

[54] PROCESS FOR DISSOLVING RADIOACTIVE CORROSION PRODUCTS FROM INTERNAL SURFACES OF A NUCLEAR REACTOR

[75] Inventor: William W. Brown, Monroeville, Pa.

[73] Assignee: Westinghouse Electric Corporation, Pittsburgh, Pa.

[21] Appl. No.: 575,664

[22] Filed: May 8, 1975

[51] Int. Cl.$^2$ .............................................. G21C 9/00
[52] U.S. Cl. ........................................ 176/37; 176/38
[58] Field of Search .......................... 176/37, 38, 92 R

[56] References Cited

U.S. PATENT DOCUMENTS 3,663,725   5/1972   Pearl ..................................... 176/38

OTHER PUBLICATIONS

General College Chemistry 3rd Ed., Keenan et al., Pub; Harper & Row pp. 151 & 152.
Ind. Eng. Chem. vol. 51, No. 10 Oct. 1959 "Coolant Technology" pp. 1262-1264.
Corrosion vol. 17, 1961 "Corrosion of Carbon and Low-Alloy Steels in Out-of-Pile Boiling-W-R Envior," pp. 269-276.

Primary Examiner—Samuel W. Engle
Assistant Examiner—Ralph Palo
Attorney, Agent, or Firm—J. R. Campbell

[57] ABSTRACT

A process for dissolving radioactive corrosion products from the internal surfaces of a nuclear reactor. In preparation for reactor refueling, the reactor coolant is depressurized and the temperature reduced to ~140° F. Hydrogen is purged from the system and the coolant repressurized to about 400 psi to permit operation of a reactor coolant circulating pump. A solution containing oxygen, preferably hydrogen peroxide, is injected into the reactor coolant which is then circulated through the reactor. The thus oxygenated coolant effects prompt and nearly complete release, at least 95% complete, of radioactive corrosion products, especially cobalt 58, from the reactor internal surfaces. The coolant is then circulated through a demineralizer which removes such products by ion exchange processes, at the completion of which, the reactor is opened to commence replacing fuel assemblies in the reactor.

5 Claims, No Drawings

PROCESS FOR DISSOLVING RADIOACTIVE CORROSION PRODUCTS FROM INTERNAL SURFACES OF A NUCLEAR REACTOR

BACKGROUND OF THE INVENTION

The invention described herein relates to nuclear reactors and more particularly to a process for dissolving into coolant normally circulated through the reactor, corrosion from the reactor internal surfaces which contain radioactive products.

During operation of a nuclear reactor, the fission process occurring in reactor fuel generates radioactive fission gases and radioactive fission products such as iodine 131 and 133, cesium 134 and 137, molybdenum 99, xenon 133 and activates reactor structural materials, such as nickel to form cobalt 58, and the like, which desirably must be removed from the coolant before reactor refueling can take place. As the reactor coolant temperature and pressure are reduced in preparation for refueling, these fission gases and products are released to the coolant and such release terminates soon after the cool-down procedure has been completed. The reactor coolant system must then be purged of fission gases before removing the reactor closure head to preclude the possibility of fission gas release to the atmosphere. Likewise, fission product removal is necessary to minimize contamination of the reactor cavity water and the associated system components. Since standard procedures are followed to effect such gas and fission product removal, techniques have been established for capturing the fission gases, and the ionic fission products are adequately removed by known ion exchange purification processes.

After the coolant is depressurized, reduced in temperature and oxygen added to the coolant water, cobalt 58, which is generated by activation of nickel in a high radiation field during reactor operation, is released from the internal surfaces of the reactor, and rapidly dissolves in the cold oxygenated cooling water. This high intensity radioactive isotope makes refueling time-consuming because protective measures must be taken to effect its removal. It must therefore be reduced to a very low level prior to actual commencement of the fuel transfer operations.

Unlike some other species of radioactivity, cobalt 58 is released into the coolant most readily when the water is cool and contains a small amount of oxygen. The methods currently used to oxygenate coolant in a closed reactor involves reducing the hydrogen level therein to about 4cc per kg, or less, and draining the reactor to about 1/3 of full volume while charging nitrogen into the space left void by the withdrawn coolant. Air is then pumped through the void space to transfer as much oxygen as possible to the water coolant. This action transfers oxygen into the water to achieve a reasonable degree of oxygenation which then causes the nickel and cobalt to dissolve in the solution.

The primary disadvantage of this method is that approximately twenty-four hours are required to obtain adequate oxygenation because the air contacts only a small portion of the coolant during the oxygenation process and circulation of the coolant throughout the system is not possible once partial draining has taken place. This time period is significant, particularly when the process is carried out on those reactors designed to a refueling schedule of 7 days or less. Coolant oxygenation and removal of cobalt 58, nickel and other radioactive species, consume approximately 25% of the time allotted for reactor refueling. It therefore is apparent that time reduction in the radioactive species removal process will significantly affect reactor down time which in turn helps minimize the electric utility's costs, and further, can provide the potential for increased revenue which flows to the utility when the reactor is in operation.

Alternatively, the injection of air or pure oxygen directly into the reactor coolant system for oxygenation purposes rather than flowing it across the water, may be acceptable for long time and relatively relaxed refueling schedules since a longer time period is required to achieve the desired degree of oxygenation. However, bubbles may appear under the reactor head or in pumps or other apparatus and form air locks which are objectionable from an operating standpoint. Since hydrogen is present in the system, the introduction of gaseous oxygen may also present a dangerous combustible mixture when vented to the atmosphere and then accidentally exposing the combined mixture to ignitable conditions.

SUMMARY OF THE INVENTION

Briefly stated, the above disadvantages of the prior art are eliminated in accordance with the teachings of this invention by injecting a solution, rather than gas, of high oxygen content into the reactor coolant after it is reduced in temperature and pressure in preparation for undertaking reactor refueling or repairs. Oxygen in the solution accelerates the release of cobalt 58 and other radioactive products from the internal reactor surfaces for dissolution into the cold oxygenated coolant early in the plant cool down procedures, thus permitting its removal by ion exchange apparatus before draining of the reactor takes place. By practicing this process, the savings in time of approximately ½ day in the refueling time of a 7-day refueling schedule is made possible.

It therefore is an object of the invention to provide a process which will cause the rapid and thorough oxygenation of reactor coolant during a cold plant shut down to effect the release of radioactive products into the coolant prior to opening the reactor for refueling or repairs.

Another object of the invention is the provision of a process which includes injecting a solution of high oxygen content into reactor coolant for quickly oxygenating the coolant to accelerate the release of solubilized cobalt 58 and other radioactive corrosion products into the cold reactor coolant.

Still another object of the invention is to provide a process which injects hydrogen peroxide in controlled amounts and strength into a closed reactor system prior to draining coolant from the reactor system for the purpose of accelerating the release of cobalt 58 and other radioactive corrosion products into the coolant.

DESCRIPTION OF THE PREFERRED EMBODIMENT

During the course of operation of a commercial size nuclear reactor, coolant is pumped through the reactor under a pressure of approximately 2250 psia and heat from the fission process raises the temperature to about 610° F. A portion of this heat is transferred to a steam generator and the coolant is then returned to the reactor for reheating and continuation of the process. As fuel burnup progresses, the reactor must be refueled to continue providing coolant having these temperature and pressure characteristics.

In preparation for refueling the reactor, a boron solution is introduced into the reactor coolant which is then depressurized and the temperature reduced to about 140° F while still maintaining the reactor cooling system in a closed condition. As indicated above, during the system cool-down and depressurization, fission gases and fission products generated during normal reactor operation are released to the coolant and such release usually terminates after cool-down is completed. Since radiation from both the fission gases and ionic end products are harmful, the coolant must be purified to required limits to maintain minimum radiation levels after the reactor system is opened to the atmosphere. Appropriate equipment and systems are therefore used to capture the gases and the fission products are removed by ion exchange purification apparatus. A number of important elements must be removed from the coolant prior to refueling, particularly cobalt 58, together with natural nickel 58, manganese 54, cobalt 60, molybdenum 99, and other radioactive products which are released from reactor structural surfaces to the coolant. This invention is directed toward a process for effecting such release from reactor structural surfaces to the coolant, so that removal from the system may be quickly accomplished.

Reactor coolant chemistry data obtained during multiple refueling shut downs have demonstrated a strong correlation between the presence of oxygen species in the coolant and the solubilization of nickel in a cold, borated coolant environment. Cobalt 58 which is a part of the nickel matrix is produced by the (n,p) nuclear reaction, i.e., neutron bombardment, on natural nickel 58 and is released simultaneously with nickel into the reactor coolant. Nickel appears in reactors in the form of an alloy or other materials used in both welding and support members for fuel assemblies and in other structural members designed to resist the high hydraulic forces of coolant as it is circulated through the reactor during normal operation. It is now known that release of cobalt 58 and other radioactive corrosion products into the coolant occurs when the reactor coolant is cold, i.e., about 140° F and oxygenated. The reduction in temperature is accomplished during normal reactor cool down procedures prior to refueling and a number of methods have been utilized for introducing oxygen into the coolant to achieve oxygenation. The disadvantages of using gases containing oxygen for pure oxygen are discussed above. However, it has been found that a solution having a high oxygen content, such as hydrogen peroxide, is highly preferable to gases because it effects a complete and rapid dissolution of the inventories of the neutron activation products in the reactor, especially cobalt 58, which is susceptible to solubilization in a cold, borated coolant environment. Also, hydrogen peroxide provides the means for a more rapid and more easily controllable method of oxygenation besides being readily available and easy to handle.

In carrying out the process of removing fission gases and radioactive fission products from the coolant, the reactor is depressurized and temperature reduced to ~140° F as indicated above. The reduction in temperature and pressure permits the release of fission gases and fission products which are removed as the coolant is circulated through gas removal equipment and demineralizers connected to the system. At this time, circulation continues and consecutive samples are taken and analyzed until the hydrogen concentration shows that the coolant has been degassed to less than 4cc per kg. From experience gained in processing these radioactive components in operating nuclear power plants, it is known that a slow release of cobalt 58 occurs during the cool down period and following degasification of hydrogen, which permits a build-up of radiolytically produced hydrogen peroxide. However, only a small amount of cobalt 58 is released thus establishing the need for injection of an oxygen bearing substance into the coolant to accelerate the release activity.

The most suitable time for addition of the hydrogen peroxide to achieve oxygenation of the coolant is immediately after the cool down has proceeded to a system temperature of ~140° F and with the system depressurized and completely filled with a solid mass of water. The system is thereupon repressurized to 400 psig to permit immediate circulation of the hydrogen peroxide upon its addition, by the reactor coolant pumps. After the system is repressurized, the hydrogen peroxide is introduced into the chemical addition tanks from which it is pumped to the reactor primary loop. When the additions from the chemical addition tank are pumped into the charging pump suction, the charging header flow should be 90-100 gpm (342-380 liters per minute) to further dilute the hydrogen peroxide solution before it enters the reactor primary loop.

The residual concentration of hydrogen peroxide in the coolant to achieve the solubilization of susceptible nickel sources is about 2 ppm. For a standard three-loop plant having a volume of 9160 cubic feet or $2.59 \times 10^5$ liters, 520 grams of hydrogen peroxide would be required to achieve a 2 ppm residual. However, since the amount of hydrogen in the system has a bearing on the amount of hydrogen peroxide to be injected in the system, if it is presumed that hydrogen peroxide will react with residual hydrogen in the coolant according to the simplified reaction, $$H_2 + H_2O_2 = 2H_2O$$

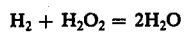

It can be seen that one mole of hydrogen will react with one mole of hydrogen peroxide on a 1:1 basis, and as a result will deplete the chemical addition of hydrogen peroxide. If a hydrogen residual of 5 cc per kg were present at the time of $H_2O_2$ addition, the molar concentration of hydrogen would be $2.23 \times 10^{-4}$M. A 2 ppm solution of $H_2O_2$ would be equivalent to $0.585 \times 10^{-4}$M. Therefore, 8 ppm of $H_2O_2$ would be required to overcome any losses through reaction with hydrogen. An additional 2 ppm, for a total of 10 ppm added, would assure a minimum residual of 2 ppm $H_2O_2$. If no hydrogen is present, a 10 ppm residual would be equally effective and would not adversely affect removal of the radioactive products.

When the hydrogen peroxide additions from the chemical addition tank are pumped into the system, the charging header flow should be 90-100 gpm. If the addition rate of hydrogen peroxide solution is throttled back to 0.5 gpm (1.9 liters per minute), a significant dilution of the 5 wt% solution will be made as it enters the charging header mixing with the 100 gpm charging flow.

$$\frac{\text{Con. In Charging Header}}{\text{After Addition (mg/l)}} = \frac{\text{(Conc. Rate Added mg/l) (Addition Rate/l min.)}}{\text{(Flow Rate in Charging Header l/min.)}} = \frac{(S \times 10^4 \text{ mg/l}) (1.9 \text{ l/min.})}{3.42 \times 10^2 \text{ l/min.}}$$

mg/l = $2.97 \times 10^2$ mg/l = 297 ppm

Thus the concentration of $H_2O_2$ in the charging header will be reduced substantially from 50,000 ppm to less than 300 ppm through the restricted rate of addition. The time required to add $H_2O_2$ to the system, at the addition flow rate of 0.5 gpm, is approximately one hour.

The addition of hydrogen peroxide causes a prompt release of cobalt 58 and other radioactive products from the reactor internal surfaces to the coolant. As the coolant is circulated through demineralizers normally included in nuclear reactor systems, the radioactive ions are absorbed by the demineralizer and the cleaned liquid is then returned to the reactor system.

It has been found that natural nickel 58, the precursor of cobalt 58, is released in a pattern identical to cobalt 58. Other activation products are released during the cool down period. Manganese 54 is released to the coolant during cool-down, but usually much of the manganese is released before the hydrogen peroxide addition, in the same pattern as cobalt 58. its concentration is usually in the order of one magnitude less than cobalt 58. When the oxidant is added, a further increase in the manganese 54 activity occurs, but is usually less than previous releases. This isotope is much less responsive to the hydrogen peroxide addition and is quickly removed from the coolant by ion exchange purification. Cobalt 60 is also released during the cool down period and a plot of the cobalt 60 data reveals a release pattern identical to that of cobalt 58. In addition to the above, molybdenum 99 a fuel fission product which is believed to deposit on reactor structural surfaces if leaked from fuel rods during reactor operation, is another radioisotope affected by the hydrogen peroxide addition.

The above disclosure has been directed toward a specific size of reactor coolant system, i.e., 9600 cu. ft., into which a certain amount of hydrogen peroxide is injected to illustrate the teachings of the invention. However, it will be apparent that such teachings are equally applicable to reactor systems of both smaller and larger sizes and many modifications and variations are therefore possible in light of the disclosure.

It therefore is to be understood that within the scope of the appended claims the invention may be practiced other than as specifically described.

What is claimed is:

1. The process for dissolving radioactive corrosion products from the internal surfaces of a nuclear reactor comprising the steps of:
   reducing the pressure and temperature of coolant circulating in a closed nuclear reactor steam supply system to about atmospheric pressure and 140° F respectively;
   continuing the circulation of said coolant to permit the release of fission gases and fission products into the circulating coolant and until the hydrogen concentration in the coolant is reduced to less than about 4cc per kg;
   increasing the pressure of said coolant to several atmospheres of pressure;
   adding a solution having an oxygen content greater than water to said circulating coolant to further cause the release of radioactive products from the reactor internal surfaces into said coolant;
   reducing the pressure of the circulating coolant to atmospheric pressure;
   passing said coolant containing said radioactive products through a demineralizer to remove said products; and
   returning the thus decontaminated coolant to the reactor steam supply system.

2. The process according to claim 1 wherein said oxygen solution consists essentially of hydrogen peroxide.

3. The process according to claim 2 wherein said radioactive products consist essentially of cobalt 58, cobalt 60, manganese 54 and molybdenum 99.

4. The process for dissolving radioactive corrosion products from the internal surfaces of a nuclear reactor comprising the steps of:
   reducing the pressure and temperature of coolant circulating in a closed nuclear reactor steam supply system having a coolant capacity of about 9600 cubic feet to about 400° psi and 140° F respectively;
   adding a water solution of hydrogen peroxide at the rate of 0.5 gpm to a reactor charging flow of about 100 gpm, and pumping said circulating coolant to provide a concentration of about 300 ppm at the point of injection to the circulating coolant, and continuing injection of hydrogen peroxide until a residual of 2 ppm $H_2O_2$ is obtained in the entire circulating coolant in the reactor system, thereby effecting the release of radioactive products from the reactor internal surfaces into said coolant;
   reducing the pressure of the circulating coolant to atmospheric pressure;
   passing said coolant containing said radioactive products through demineralizing apparatus to remove said products; and
   returning the thus decontaminated coolant to the reactor coolant system.

5. The process according to claim 1 including the step of continuing to add said solution until the residual concentration thereof in said coolant is about 2 ppm.

* * * * *